(12) United States Patent
Huang et al.

(10) Patent No.: US 6,901,443 B1
(45) Date of Patent: May 31, 2005

(54) NON-FAULT TOLERANT NETWORK NODES IN A MULTIPLE FAULT TOLERANT NETWORK

(75) Inventors: Jiandong Huang, Plymouth, MN (US); Sejun Song, Minneapolis, MN (US); Tony J. Kozlik, Phoenix, AZ (US); Ronald J. Freimark, Scottsdale, AZ (US); Jay W. Gustin, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/522,702

(22) Filed: Mar. 10, 2000

(51) Int. Cl.$^7$ ...................... G06F 15/173; G06F 15/16; G06F 11/00; G06F 3/00; H04L 12/56

(52) U.S. Cl. ...................... 709/224; 709/238; 709/239; 709/240; 709/242; 709/243; 709/244; 709/245; 714/4; 370/218; 370/390; 370/404; 710/104

(58) Field of Search ................................. 709/238, 239, 709/240, 242, 243, 244, 245, 203, 220, 224, 249–251, 253; 714/4; 370/404, 390, 218; 710/104

(56) References Cited

U.S. PATENT DOCUMENTS

| | | | |
|---|---|---|---|
| 5,751,574 A | 5/1998 | Loebig | |
| 5,852,724 A * | 12/1998 | Glenn et al. | 709/239 |
| 5,862,344 A * | 1/1999 | Hart | 709/238 |
| 5,963,540 A | 10/1999 | Bhaskaran | |
| 6,070,187 A * | 5/2000 | Subramaniam et al. | 709/220 |
| 6,108,300 A * | 8/2000 | Coile et al. | 714/4 |
| 6,112,249 A * | 8/2000 | Bader et al. | 709/239 |
| 6,173,312 B1 * | 1/2001 | Atarashi et al. | 709/203 |
| 6,356,622 B1 * | 3/2002 | Hassell et al. | 379/1.01 |
| 6,370,654 B1 * | 4/2002 | Law et al. | 714/4 |
| 6,374,316 B1 * | 4/2002 | James et al. | 710/104 |
| 6,389,030 B1 * | 5/2002 | Coden | 370/404 |
| 6,392,990 B1 * | 5/2002 | Tosey et al. | 370/218 |
| 6,408,000 B1 * | 6/2002 | Lamberg et al. | 370/390 |
| 6,535,990 B1 * | 3/2003 | Iterum et al. | 714/4 |

* cited by examiner

*Primary Examiner*—Jospeh Feild
*Assistant Examiner*—Chau Nguyen

(57) ABSTRACT

The present invention provides a method and apparatus for facilitating communication with non-fault tolerant network nodes in a fault-tolerant network environment. In various embodiments, a network address or network location of any network nodes present on a network that are not fault-tolerant is determined and stored, and data intended for the detected non-fault-tolerant network nodes is routed only over that network to which the non-fault-tolerant network node is connected. In further embodiments, the fault-tolerant network comprises a primary and redundant network with fault tolerant network nodes that are attached to each network; a non-fault-tolerant network node that is attached to either the primary or redundant network is then operable to communicate with any fault-tolerant network node via data sent over only the network to which the non-fault-tolerant network node is connected.

15 Claims, 2 Drawing Sheets

NON-FAULT TOLERANT NETWORK NODES IN A MULTIPLE FAULT TOLERANT NETWORK

FIELD OF THE INVENTION

The invention relates generally to computer networks, and more specifically to a method and apparatus providing non-fault tolerant network node operability in a fault-tolerant network.

NOTICE OF COPENDING APPLICATIONS

This application is related to the following copending applications, which are hereby incorporated by reference: "Fault Tolerant Networking", Ser. No. 09/188,976 now U.S. Pat. No. 6,308,282, which issued on Oct. 23, 2001; and "Multiple Network Fault Tolerance via Redundant Network Control", Ser. No. 09/513,010, filed Feb. 25, 2000.

BACKGROUND OF THE INVENTION

Computer networks have become increasingly important to communication and productivity in environments where computers are utilized for work. Electronic mail has in many situations replaced paper mail and faxes as a means of distribution of information, and the availability of vast amounts of information on the Internet has become an invaluable resource both for many work-related and personal tasks. The ability to exchange data over computer networks also enables sharing of computer resources such as printers in a work environment, and enables centralized network-based management of the networked computers.

For example, an office worker's personal computer may run software that is installed and updated automatically via a network, and that generates data that is printed to a networked printer shared by people in several different offices. The network may be used to inventory the software and hardware installed in each personal computer, greatly simplifying the task of inventory management. Also, the software and hardware configuration of each computer may be managed via the network, making the task of user support easier in a networked environment.

Networked computers also typically are connected to one or more network servers that provide data and resources to the networked computers. For example, a server may store a number of software applications that can be executed by the networked computers, or may store a database of data that can be accessed and utilized by the networked computers. The network servers typically also manage access to certain networked devices such as printers, which can be utilized by any of the networked computers. Also, a server may facilitate exchange of data such as e-mail or other similar services between the networked computers.

Connection from the local network to a larger network such as the Internet can provide greater ability to exchange data, such as by providing Internet e-mail access or access to the World Wide Web. These data connections make conducting business via the Internet practical, and have contributed to the growth in development and use of computer networks. Internet servers that provide data and serve functions such as e-commerce, streaming audio or video, e-mail, or provide other content rely on the operation of local networks as well as the Internet to provide a path between such data servers and client computer systems.

But like other electronic systems, networks are subject to failures. Misconfiguration, broken wires, failed electronic components, and a number of other factors can cause a computer network connection to fail, leading to possible inoperability of the computer network. Such failures can be minimized in critical networking environments such as process control, medical, or other critical applications by utilization of backup or redundant network components. One example is use of a second network connection to critical network nodes providing the same function as the first network connection. But, management of the network connections to facilitate operation in the event of a network failure can be a difficult task, and is itself subject to the ability of a network system or user to properly detect and compensate for the network fault. Furthermore, when both a primary and redundant network develop faults, exclusive use of either network will not provide full network operability.

One solution is use of a method or apparatus that can detect and manage the state of a network of computers utilizing redundant communication channels. Such a system incorporates in various embodiments nodes which are capable of detecting and managing the state of communication channels between the node and each other fault-tolerant network node to which it is connected. In some embodiments, such network nodes employ a network status data record indicating the state of each of a primary and redundant network connection to each other node, and further employ logic enabling determination of an operable data path to send and receive data between each pair of nodes.

But, such networks will desirably include nodes which do not have full fault-tolerant capability. One common example of such a non-fault-tolerant network node is a standard office laser printer with a built-in network connection. What is needed is a method and apparatus to facilitate communication with non-fault-tolerant network nodes in such a fault-tolerant network system.

SUMMARY OF THE INVENTION

The present invention provides a method and apparatus for operation of non-fault tolerant network nodes in a fault-tolerant network environment. In some embodiments, a network address or network location of any network nodes present on a network that are not fault-tolerant is determined and stored, and data to be sent to the detected non-fault-tolerant network nodes is routed only over that network to which the non-fault-tolerant network node is connected. In various further embodiments, the fault-tolerant network comprises a primary and redundant network with fault tolerant network nodes that are attached to each network; a non-fault-tolerant network node that is attached to either the primary or redundant network is then operable to communicates with any fault-tolerant network node via data sent over only the network to which the non-fault-tolerant network node is connected.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a method and apparatus for managing communication with non-fault-tolerant network nodes in a fault-tolerant network. The invention is capable in various embodiments of identifying the network location and address of non-fault tolerant network nodes, and of routing data only over certain portions of the network to communicate with the non-fault-tolerant network node. The network in some embodiments comprises a primary and a redundant network having connections to each fault-tolerant network node, and the invention comprises routing information to non-fault-tolerant network nodes connected to either the primary or redundant network via only that network to which the non-fault-tolerant network node is connected.

The invention in various forms is implemented within an existing network interface technology, such as Ethernet. In one such embodiment, the fault-tolerant network comprises two Ethernet connections connected to each fault-tolerant computer or node—a primary network connection and a redundant network connection. It is not critical for purposes of the invention which connection is the primary connection and which is the redundant connection, as the connections are physically and functionally similar. In the example embodiment discussed here, the primary and redundant network connections are interchangeable and are named primarily for the purpose of distinguishing the two networks from each other. Each of the primary and redundant networks also may have one or more non-fault-tolerant network nodes attached, and communication with such non-fault-tolerant networks is facilitated by the present invention.

Figure 1:
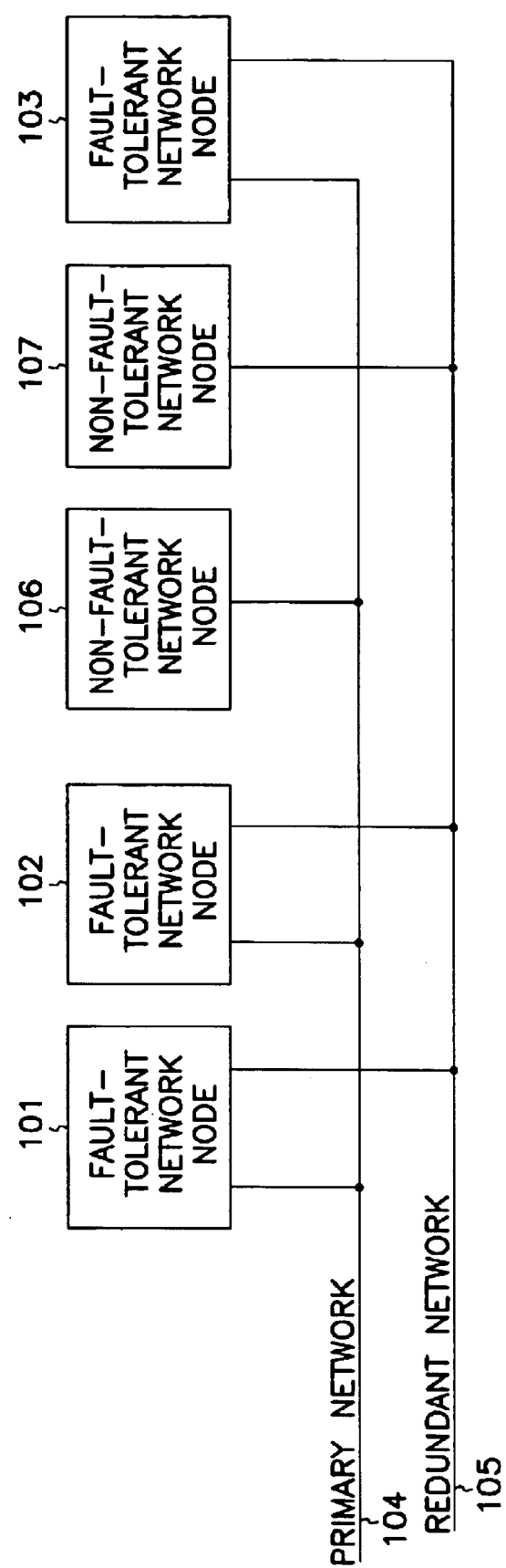
FIG. 1 shows a diagram of a fault-tolerant computer network with multiple fault-tolerant network nodes having primary and redundant network connections and having multiple non-fault-tolerant network nodes, consistent with an embodiment of the present invention.

FIG. 1 illustrates an exemplary fault-tolerant network with fault-tolerant network nodes 101, 102 and 103. A primary network 104 and a redundant network 105 link each node to the other nodes of the network, as indicated by the lines connecting the nodes to each of the networks. Non-fault tolerant network nodes are also connected to each network, including non-fault-tolerant network node 106 connected to the primary network 104 and non-fault-tolerant network node 107 connected to redundant network 105.

The fault-tolerant network connections linking the fault-tolerant network nodes are configured such that the fault-tolerant network nodes can communicate with each other despite multiple network faults, such as by use in some embodiments of particular node-to-node communication rules and network status monitoring capability within each node. The communication rules in various embodiments of a fault-tolerant network facilitate determination of a network path between each pair of nodes based on the network status data stored in and communicated between each fault-tolerant network node. Each fault-tolerant network node of such a system must be able to recognize non-fault-tolerant network nodes and adapt its communication rules for communicating with non-fault-tolerant network nodes such as nodes 106 and 107 of the example network of FIG. 1.

In a typical single network configuration, data intended for a network node is simply sent over the network to the intended node. But, where multiple networks are combined to form a fault-tolerant network capable of compensating for multiple faults such as the network of FIG. 1, data intended for a single non-fault-tolerant network node such as node 106 or 107 is desirably sent over the specific network to which the non-fault-tolerant network node is connected.

In some embodiments of the invention, data intended for a non-fault-tolerant network node such as non-fault-tolerant network node 106 is simply broadcast or transmitted over both the primary network 104 and the redundant network 105, ensuring that the data is sent to the network to which the non-fault-tolerant network node is connected. Such a system does not require tracking addresses or locations of non-fault-tolerant network nodes, and simply relies on the network interface adapters of the redundant network 105 to filter out the extra data. But, such a configuration is reliant on the ability of the nodes connected to the redundant network 105 to ignore the data intended for a network node not attached to that network, and further wastes network bandwidth on the redundant network.

Other embodiments of the invention comprise maintaining an address table of detected non-fault-tolerant network nodes that are present on both the primary network 104 and the redundant network 105, and further associating each address or non-fault-tolerant network node with the network on which the node address was detected. In some embodiments of the invention, detection of the non-fault-tolerant network node address comprises monitoring for and intercepting Internet Protocol (IP) Address Resolution Protocol (ARP) packets that are sent by each node in certain IP-compatible network configurations. For example, each ARP packet in an Ethernet network contains the Media Access Control (MAC) address that uniquely identifies the node transmitting the IP ARP packet. The intercepted MAC address of each non-fault-tolerant network node is then recorded along with the network on which the non-fault-tolerant network node is detected. In other embodiments, other network hardware and communication protocols may be used for the same purpose, and are within the scope of the invention.

To send data from a fault-tolerant network node to a non-fault-tolerant network node in such embodiments of the invention, the address of the desired node is found in the stored address records of the sending fault-tolerant network node, and the associated network is determined. For example, if fault-tolerant network node 101 initiates a data transfer to non-fault-tolerant network node 106, node 101 searches its stored address records and finds the address of node 106, and further finds that the address data for node 106 was received on the primary network 104 rather than the redundant network 105. Node 101 then sends the data intended for node 106 only over network 104, eliminating the need to send the same data over redundant network 105 and use additional network bandwidth.

In further embodiments of the invention, fault-tolerant network nodes such as node 101 use the network status data indicating the ability of that node to communicate with other fault-tolerant network nodes to reroute data intended for a non-fault-tolerant network node around a network fault. This is achieved in some embodiments by initially sending the data on the network on which the non-fault-tolerant network node does not reside and using a selected fault-tolerant network node to transfer the sent data to the network on which the non-fault-tolerant network node resides at a point on the non-fault-tolerant network node's network such that the fault on the non-fault-tolerant network node's network is not between the transferring node and the non-faulttolerant receiving node. Other embodiments exist in which data can be rerouted across the fault-tolerant networks to avoid multiple faults, and are within the scope of the invention.

In further embodiments, data sent to non-fault-tolerant network nodes is sent over all networks in the fault-tolerant network system rather than sent over a single network if the record containing address and network data for non-fault-tolerant network nodes does not contain data on the intended destination non-fault-tolerant network node. Sending such data comprises sending or replicating the data on both the primary and redundant network of the example network discussed above and shown in FIG. 1.

Figure 2:
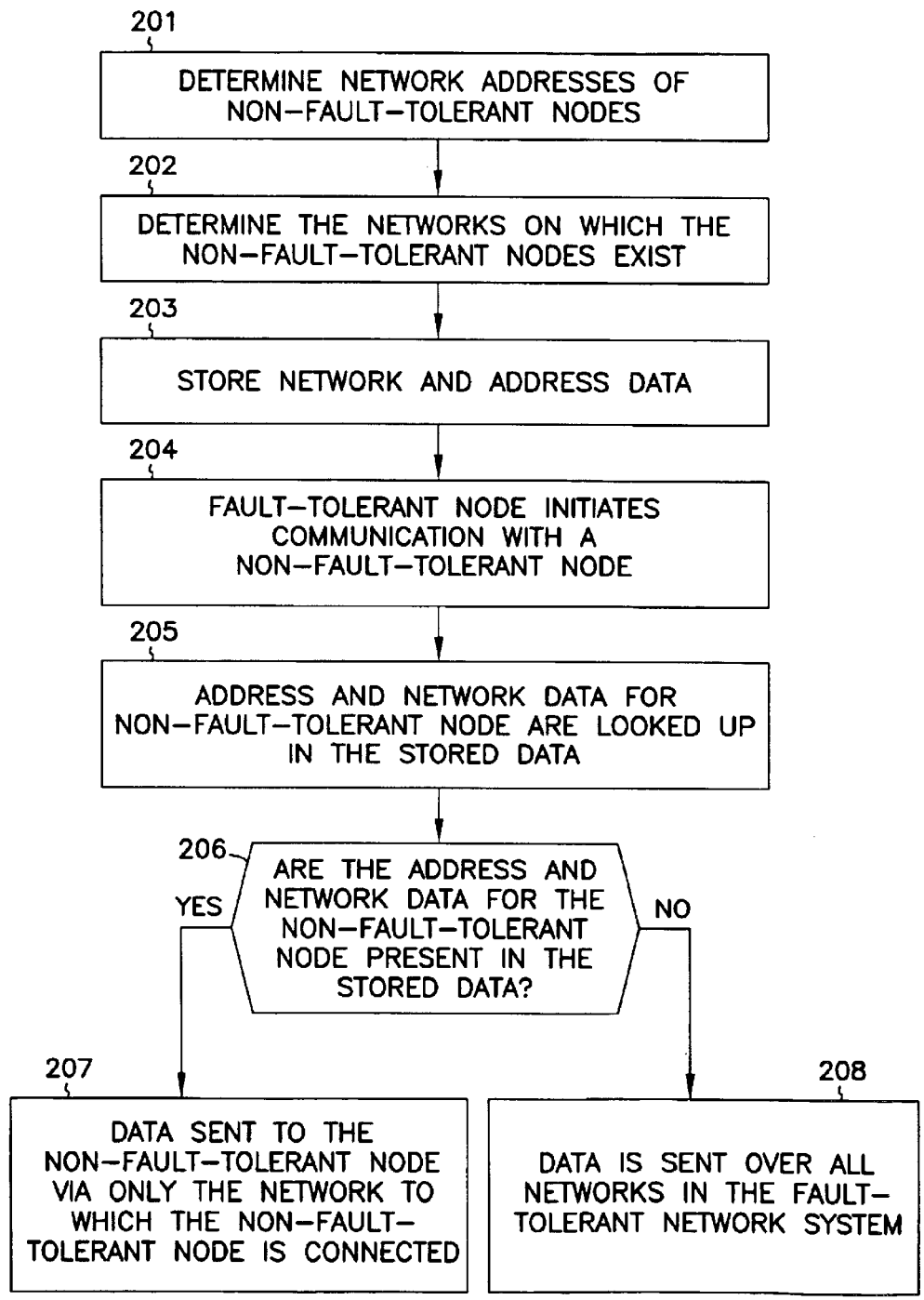
FIG. 2 shows a flowchart of a method of managing communication with non-fault-tolerant network nodes in a fault-tolerant computer network, consistent with an embodiment of the present invention.

FIG. 2 is a flowchart of a method of managing communication between fault-tolerant network nodes and non-fault-tolerant network nodes in a fault-tolerant network such as the example network of FIG. 1. At 201, each fault-tolerant network node determines the network address of any non-fault-tolerant network nodes present on each network to which the fault-tolerant network node is connected. This may be achieved in any suitable manner, including searching for IP ARP packets or other identifying data transmitted by the non-fault-tolerant network nodes. At 202, each fault-tolerant network node further determines the network on which each non-fault-tolerant network node exists. In some embodiments, this simply comprises detecting which network adapter in the detecting fault-tolerant network node detected the IP ARP packet or other identifying data. At 203, the fault-tolerant network nodes each store the data determined at 201 and 202. The address and network data for each non-fault-tolerant network node are associated with each other in the stored data in one embodiment, so that looking up a record for a particular non-fault-tolerant network node results in retrieval of both the network address of the node and the network on which the node resides. In various embodiments, the process of determination of network addresses and networks associated with each non-fault-tolerant network node and the storing of this data is a continuous process, and occurs even during other operations such as execution of other blocks of the flowchart of FIG. 2.

At 204, a fault-tolerant network node initiates sending data to a non-fault-tolerant network node. At 205, the stored data is searched for the address and network of the non-fault-tolerant network node. At 206, a decision is made based on determination of whether the address and network data for the non-fault-tolerant network node are present in the stored data. If the address and network data are present in the stored data, the data to be sent is sent from the fault-tolerant network node to the non-fault-tolerant network node over only that network to which the stored data indicates the non-fault-tolerant network node is connected at 207. In other embodiments, the data is sent indirectly via one or more intermediate nodes to the non-fault-tolerant network node, to avoid one or more network faults. If the address and network data are not present in the stored data, the data to be sent is sent over all networks to which the sending fault-tolerant network node is connected to ensure that the intended non-fault-tolerant network node receives the data. In the example of FIG. 1, the data would be sent over both the primary network 104 and the redundant network 105.

The present invention provides a method and apparatus that enable a network with primary and redundant network connections to manage routing of data to non-fault-tolerant network nodes within the network. Some embodiments of the invention incorporate a data record within each fault-tolerant network node that contains detected address and network data for each non-fault-tolerant network node, and which then is used by the fault-tolerant network node to determine over which network data intended for a specific non-fault-tolerant network node should be sent. In some embodiments, the invention includes rerouting data that cannot be transferred directly from a fault-tolerant network node to a non-fault-tolerant network node due to a network fault, and comprises routing the data to one or more intermediate nodes which are able to facilitate communication between the nodes.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of managing communication in a fault-tolerant computer network comprising at least one non-fault tolerant node and at least one fault tolerant node, the method comprising the steps of:

detecting network addresses of each of the at least one non-fault tolerant node coupled to either a primary network or a redundant network of a plurality of networks that form the fault-tolerant computer network;

determining to which of the network of the plurality of networks the at least one non-fault tolerant node is coupled;

storing the detected network addresses data of each of the at least one non-fault tolerant node;

storing associated network data comprising the network to which each of the at least one non-fault tolerant node is coupled therewith;

prior to sending data from one of the fault tolerant nodes to a selected one of the at least one non-fault tolerant node, searching the stored detected network addresses and the stored associated data to determine if the network address and the associated network data of the selected one of the at least one non-fault tolerant node is stored;

if the network address and the associated data is stored for the selected at least one non-fault tolerant node, sending data intended for the selected at least one non-fault tolerant node over only the network to which the at least one non-fault tolerant node is coupled; and if the network address and the associated data is not stored for the selected non-fault tolerant node, sending data intended for the selected at least one non-fault tolerant node over the plurality of networks.

2. The method of claim 1, wherein the step of detecting network addresses of each of the non-fault-tolerant network node comprises detecting network address information that each of the at least one non-fault tolerant network node send over the network to which it is coupled.

3. The method of claim 2, wherein the step of detecting network address information comprises the step of detecting Internet Protocol Address Resolution Protocol packets (IP ARP packets).

4. The method of claim 2, wherein the step of determining which of the network to which the at least one non-fault-tolerant network node is coupled comprises the step of determining which network interface received the network address information sent from each of the at least one non-fault-tolerant network node.

5. The method of claim 1, wherein the step of storing the data comprises the step of populating a non-fault-tolerant network node address table.

6. A fault-tolerant network node interface operable to communicate with one or more non-fault tolerant network nodes, the interface operable to:
- detect network addresses for each of the one or more non-fault network nodes coupled to a primary network or a redundant network of a plurality of networks that form a fault-tolerant network;
- determine the network of the plurality of networks to which each of the one or more non-fault tolerant network nodes are coupled;
- store the detected network address data of each of the one or more non-fault tolerant network nodes;
- store associated network data comprising the network on which each of the one or more non-fault tolerant network nodes are determined to be coupled therewith;
- prior to sending data to a selected one of the one or more non-fault tolerant nodes, search the stored detected network addresses and the associated data to determine if the network address and the associated network data of the selected one of the one or more non-fault tolerant is stored;
- if the network address and the associated data are stored for the selected one of the one or more non-fault tolerant nodes, send data intended for the selected one of the one or more non-fault tolerant network nodes over only the network on which the selected one of the one or more non-fault tolerant network nodes has been determined to be coupled; and
- if the network address and the associated data are not stored for the selected one of the one or more non-fault tolerant nodes, send data intended for the selected one of the one or more non-fault tolerant network nodes over the plurality of networks.

7. The interface of claim 6, wherein the network addresses of the one or more non-fault-tolerant network nodes are determined by detecting of network address information that the one or more non-fault-tolerant network nodes send over the one network.

8. The interface of claim 7, wherein the network address information that is sent comprises Internet Protocol Address Resolution Protocol packets (IP ARP packets).

9. The interface of claim 7, wherein determining the network to which the one or more non-fault-tolerant network nodes are coupled comprises determining which network interface received the network address information sent from the one or more non-fault-tolerant network nodes.

10. The interface of claim 6, wherein the detected network addresses and the associated data are stored in a non-fault-tolerant network node address table.

11. A computer program product stored on a computer readable storage medium having computer readable program code, wherein the computer readable program code when executed on a computerized system is operable to cause the computerized system to detect network addresses of the one or more non-fault network nodes coupled to a primary network or a redundant network of a plurality of networks that form a fault-tolerant network;
- determine the network of the plurality of networks to which each of the non-fault tolerant network nodes coupled;
- store the detected network address data of each of the non-fault tolerant network nodes;
- store associated network data comprising the network to which each of the non-fault tolerant network nodes are determined to be coupled therewith;
- prior to sending data to a selected one of the non-fault tolerant nodes, search the stored detected network addresses and the associated data to determine if the network address and associated network data of the selected non-fault tolerant is stored;
- if the network address and the associated data are stored for the selected non-fault tolerant node, send data intended for the selected non-fault tolerant network node over only the network on which the selected non-fault tolerant network node has been determined to be coupled; and
- if the network address and the associated data are not stored for the selected non-fault tolerant node, send data intended for the selected non-fault tolerant network node over the plurality of networks.

12. The computer program product of the claim 11, wherein the network address of each of the non-fault-tolerant network nodes is detected by network address information that the non-fault-tolerant network node sends over the one network to which it is coupled.

13. The computer program product of claim 12, wherein the network address information that is sent comprises Internet Protocol Address Resolution Protocol packets (IP ARP packets).

14. The computer program product of claim 12, wherein the network to which each of the non-fault-tolerant network nodes coupled is determined by which one of a plurality of fault tolerant interfaces received the network address information sent from the non-fault-tolerant network node.

15. The computer program product of claim 11, the data is stored in a non-fault-tolerant network node address table.

* * * * *